(12) United States Patent
Maurer

(10) Patent No.: US 6,749,781 B1
(45) Date of Patent: Jun. 15, 2004

(54) METHOD OF MAKING A SHOE SOLE HAVING A THERMOPLASTIC LAYER

(75) Inventor: Niles F. Maurer, Steelville, MO (US)

(73) Assignee: Meramec Group, Inc., Sullivan, MO (US)

( * ) Notice: Subject to any disclaimer, the term of this patent is extended or adjusted under 35 U.S.C. 154(b) by 82 days.

(21) Appl. No.: 09/801,882

(22) Filed: Mar. 8, 2001

(51) Int. Cl.[7] .................. B29C 39/12; B29C 43/02; B29C 44/06
(52) U.S. Cl. .................. 264/46.4; 264/250; 264/251; 264/259
(58) Field of Search .................. 264/46.4, 250, 264/251, 259

(56) References Cited

U.S. PATENT DOCUMENTS

| | | |
|---|---|---|
| 3,086,532 A | 4/1963 | Mistarz |
| 3,293,494 A | 12/1966 | Fischer |
| 3,574,895 A * | 4/1971 | McLlivin .................. 425/119 |
| 3,589,036 A | 6/1971 | Hendricks et al. |
| 3,932,950 A | 1/1976 | Taber |
| 3,971,145 A | 7/1976 | Stegerwald |
| 4,465,448 A * | 8/1984 | Aldridge .................. 425/119 |
| 4,581,187 A * | 4/1986 | Sullivan et al. .................. 264/46.4 |
| 4,605,455 A * | 8/1986 | Lai .................. 156/78 |
| 4,733,483 A | 3/1988 | Lin |
| 4,890,397 A | 1/1990 | Harada et al. |
| 4,897,936 A | 2/1990 | Fuerst |
| 5,473,827 A | 12/1995 | Barre et al. |
| 5,477,577 A * | 12/1995 | Hadley .................. 12/142 R |
| 5,657,556 A * | 8/1997 | Bemis .................. 36/30 R |
| 5,832,636 A * | 11/1998 | Lyden et al. .................. 36/59 R |
| 5,906,872 A | 5/1999 | Lyden et al. |
| 5,972,257 A * | 10/1999 | Liu .................. 264/40.4 |
| 5,976,451 A | 11/1999 | Skaja et al. |
| 5,983,527 A | 11/1999 | Strickland et al. |
| 6,041,520 A * | 3/2000 | Aoki .................. 36/14 |
| 2002/0157281 A1 * | 10/2002 | Safdeye et al. .................. 26/59 R |

* cited by examiner

Primary Examiner—Allan R. Kuhns
(74) Attorney, Agent, or Firm—Thompson Coburn LLP

(57) ABSTRACT

A method of making a shoe sole. The method comprising introducing a sheet portion of a thermoplastic material into a first mold, introducing a quantity of an outsole material into the first mold, and using the first mold to form an outsole member comprised of the outsole material and the sheet portion with the sheet portion being secured to the outsole material. The method further comprises introducing the outsole member into a second mold, introducing a quantity of a midsole material into the second mold, the midsole material being in liquid form when introduced in the second mold, and allowing the liquid midsole material to cure to a resilient condition to form a midsole portion secured to the sheet portion. The midsole portion and outsole member constitute the shoe sole.

15 Claims, 1 Drawing Sheet

METHOD OF MAKING A SHOE SOLE HAVING A THERMOPLASTIC LAYER

BACKGROUND OF THE INVENTION

This invention relates to methods of making shoe soles having outsoles and midsoles.

Conventional dual density shoe soles often have solid rubber outsoles and blown polyurethane midsoles secured to the outsoles. One approach to manufacturing such shoe soles has been to acquire a rubber outsole from a rubber supplier, acquire a blown polyurethane midsole from another source, and bond the midsole to the outsole using a suitable heat-activated adhesive. This manufacturing approach involves utilization of appropriate dry times, heat-activation temperatures (usually 115° F. to 140° F.) and pressures. Although this process produces suitable shoe soles, it is highly labor intensive and therefore expensive.

A second approach to making a shoe sole with a rubber outsole and polyurethane midsole comprises obtaining a rubber outsole from a rubber supplier, applying a polyurethane adhesive to the upper surface of the outsole, allowing the adhesive to dry, heating the outsole (e.g., 115° F. to 140° F.) to heat-activate the adhesive, and then pouring a liquid polyurethane directly on the rubber outsole. Although this system can produce suitable shoe soles, it requires the additional time of allowing the adhesive to dry. It also requires the delicate step of heat-activation before pouring of the liquid polyurethane. If the heat-activation step is not performed properly, the midsole might not be adequately bonded to the outsole.

A third approach comprises obtaining a solid rubber outsole which has been specifically formulated and treated with a chlorine solvent solution to accept a liquid polyurethane layer directly from the polyurethane molder without a liquid layer of adhesive being applied. Although this process occasionally produces suitable shoe soles, the results are not consistent enough to guarantee acceptable bonds. Additionally, the treatment on these outsoles degrade with time. Thus, such treated outsoles have a limited shelf life.

SUMMARY OF THE INVENTION

Among the several advantages of the present invention may be noted the provision of an improved method of making shoe soles; the provision of such a method which consistently produces high quality shoe soles; the provision of such a method which is not labor intensive; the provision of such a method which produces shoe sole components with a virtually unlimited shelf life; the provision of such a method which minimizes the time necessary to make a shoe sole; the provision of such a method which is cost effective; the provision of an improved outsole component; and the provision of such an outsole component which overcomes the disadvantages associated with the prior art.

In general, a method of the present invention is for making a shoe sole. The method comprises introducing a sheet portion of a thermoplastic material into a first mold, and introducing a quantity of a first sole material into the first mold, using the first mold to form a one piece member comprised of the first sole material and the sheet portion with the sheet portion being secured to the first sole material. The method further comprises introducing the one piece member into a second mold, introducing a quantity of a second sole material into the second mold, the second sole material being in liquid form when introduced in the second mold, and allowing the liquid to cure to a resilient condition such that the cured second sole material is secured to the sheet portion. The second sole material and the one piece member constitute the shoe sole.

Another aspect of the present invention is a method of making an outsole for a shoe sole. The method comprises introducing a sheet portion of a thermoplastic material into a mold, introducing a quantity of an outsole material into the mold, using the mold to form an outsole member comprised of the first sole material and the sheet portion with the sheet portion being secured to the first sole material, and removing the outsole member from the mold.

Another aspect of the present invention is an outsole member for a shoe sole. The outsole member comprises an outsole portion and a thermoplastic urethane layer. The outsole portion is of an elastomeric solid material and includes a bottom surface and a top surface opposite the bottom surface. The bottom surface is adapted for engaging a surface, such as a floor, when a wearer is wearing a shoe comprised of the outsole portion. The thermoplastic urethane layer has a bottom surface and a top surface. The bottom surface of the thermoplastic layer is secured to the top surface of the outsole portion.

Another aspect of the present invention is a shoe sole. The shoe sole comprises an outsole portion of an outsole material, a midsole portion of a midsole material, and a thermoplastic layer between the outsole and the midsole. The thermoplastic layer secures the outsole to the midsole.

Other objects and features will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
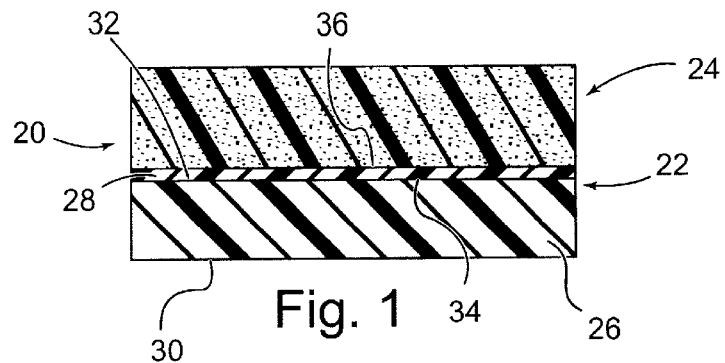
FIG. 1 is a schematic cross-sectional view of a shoe sole of the present invention, the shoe sole having an outsole member and a midsole portion, the outsole member comprising an outsole portion and a thermoplastic layer.

Referring now to the drawings, and first more particularly to FIG. 1, a shoe sole of the present invention is indicated in its entirety by the reference numeral 20. The shoe sole 20 comprises an outsole member, generally indicated at 22, and a midsole portion, generally indicated at 24. The outsole member 22 comprises an outsole portion 26 and a thermoplastic layer 28. The outsole portion 26 is of a suitable outsole material and is preferably of an elastomeric solid material or any other suitable synthetic rubber material. The outsole portion 26 has a bottom surface 30 and a top surface 32 opposite the bottom surface. The bottom surface 30 of the outsole portion 26 is adapted for engaging a surface (not shown), such as a floor, when a wearer is wearing a shoe (not shown) comprised of the outsole portion. The midsole portion 24 is of a midsole material and is preferably of a blown polyurethane. The thermoplastic layer 28 is preferably of a thermoplastic urethane sheet. The thermoplastic urethane layer 28 secures the outsole portion 26 to the midsole portion 24. The thermoplastic layer 28 has a bottom surface 34 and a top surface 36. The bottom surface 34 of the thermoplastic layer 28 is preferably directly secured to the top surface 32 of the outsole portion 26. The top surface 36 of the thermoplastic layer 28 is preferably directly secured to the midsole portion 24.

Figure 2:
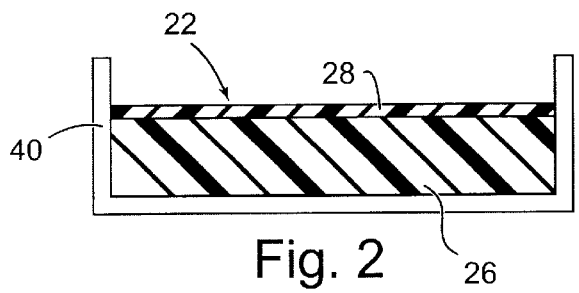
FIG. 2 is a schematic cross-sectional view of a first mold for making the outsole member of FIG. 1.
Figure 3:
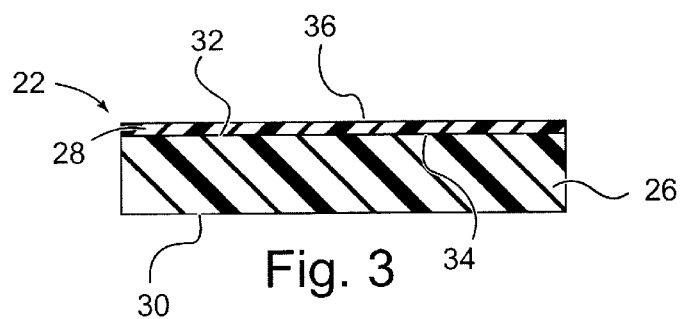
FIG. 3 is a schematic cross-sectional view of the outsole member of FIG. 1.

Referring now to FIGS. 2 and 3, the outsole member 22 is manufactured using a first mold 40. Although shown only in schematic form, it is to be understood that the first mold 40 is preferably a compression mold. A quantity of outsole material is introduced into the first mold 40. Preferably, the outsole material is a solid elastomeric material and is in solid form when introduced into the first mold 40. For example, the outsole material may be of the type commercially available from Biltrite Corporation of Waltham, Mass. under the product designation Black Nitrite Sole (#326 stock). Also introduced into the first mold 40 is a thermoplastic urethane sheet portion, such as that commercially available from JPS Elastomerics Corporation of East Hampton, Mass., under the product designation #1880 TPU film. Although the step of introducing the outsole material into the first mold is discussed before the step of introducing the sheet portion, it is to be understood that the order of these steps is unimportant to the present invention. With the outsole material and sheet portion both introduced into the first mold 40, the mold is operated to form the outsole member 22 via a compression mold process. The compression mold process causes the bottom surface 34 of the thermoplastic layer 28 to be permanently secured to the top surface 32 of the outsole portion 26. After the outsole member 22 is formed, it is removed from the first mold 40. FIG. 2 shows the outsole member 22 in the first mold 40 after formation of the outsole member but before removal of the outsole member from the first mold. FIG. 3 shows the outsole member 22 after removal from the first mold 40.

After the outsole member 22 is formed, it may be used immediately in the manufacture of the outsole 20 (FIG. 1). Alternatively, it may be shipped to another manufacturing facility for completion of the manufacture of the outsole 20, or it may stored for an extended period of time for later manufacture of the outsole.

Figure 4:
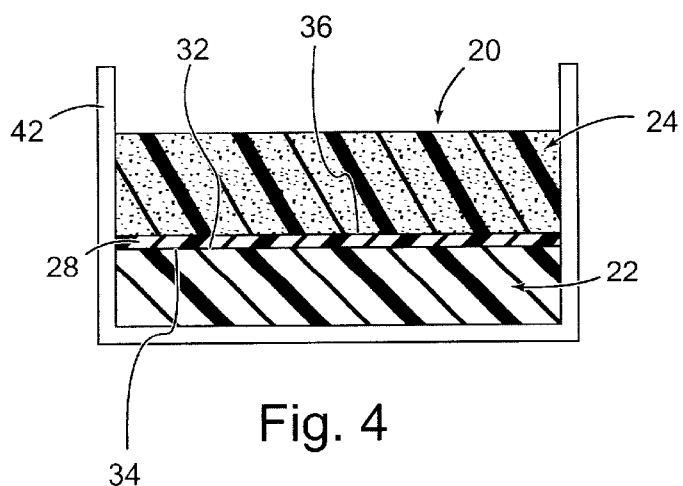
FIG. 4 is a schematic cross-sectional view showing the outsole member of FIG. 3 inserted into a second mold and a midsole material introduced into the second mold to form the shoe sole of FIG. 1.

Referring now to FIG. 4, a second mold 42 is used to complete the manufacture of the outsole 20. The outsole member 22 is placed into the second mold 42 and a liquid midsole material is introduced into the second mold. Preferably, the liquid midsole material is a liquid two-component polyurethane derived either from polyester or polyether. For example, the liquid midsole material may be of the type commercially available from Bayer Corporation of Pittsburgh, Pa. under the product designation Bayflex. The midsole material and the thermoplastic sheet portion are selected so that a chemical affinity exists between the two. The liquid midsole material then cures to a resilient condition to form the midsole portion 24 on the top surface 36 of the thermoplastic layer 28. After the midsole material cures, the shoe sole 20 is removed from the second mold 42. FIG. 4 shows the shoe sole 20 in the second mold 42 after formation of the shoe sole but before removal of the shoe sole from the second mold. FIG. 1 shows the shoe sole 20 after removal from the second mold 42.

The above-described method of forming the shoe sole 20 is an elegant, cost-effective method of producing high quality shoe soles in which the outsole portion remains attached to the midsole portion. The thermoplastic layer 28 permanently and securely fixes the outsole portion 26 to the midsole portion 24. Also, the chemical makeup of the thermoplastic layer 28 does not degrade over time. Thus, the thermoplastic layer will securely fix the outsole portion 26 to the midsole portion even when a long interval of time passes between formation of the outsole member 22 and formation of the midsole portion 24.

In view of the above, it will be seen that the several objects of the invention are achieved and other advantageous results attained.

As various changes could be made in the above methods and constructions without departing from the scope of the invention, it is intended that all matter contained in the above description or shown in the accompanying drawings shall be interpreted as illustrative and not in a limiting sense.

What is claimed is:

1. A method of making a shoe sole, the method comprising:

introducing a sheet portion of a thermoplastic material into a first mold;

introducing a quantity of a first sole material into the first mold;

using the first mold to form a one piece member comprised of the first sole material and the sheet portion with the sheet portion being secured to the first sole material;

introducing the one piece member into a second mold;

introducing a quantity of a second sole material into the second mold, the second sole material being in liquid form when introduced in the second mold, the liquid second sole material being curable to a resilient condition;

allowing the liquid to cure to the resilient condition such that the cured second sole material is secured to the sheet portion, the second sole material and the one piece member constituting the shoe sole.

2. A method as set forth in claim 1 further comprising the step of removing the shoe sole from the second mold.

3. A method as set forth in claim 2 wherein the step of allowing the liquid to cure precedes the step of removing the shoe sole from the second mold.

4. A method as set forth in claim 1 wherein the step of introducing the quantity of the first sole material into the first mold comprises introducing a solid elastomer material into the first mold.

5. A method as set forth in claim 4 wherein the step of using the first mold to form the one piece member comprises using the first mold to form the one piece member via a compression mold process.

6. A method as set forth in claim 1 wherein the first sole material is an outsole material and wherein the second sole material is a midsole material.

7. A method as set forth in claim 1 wherein the second sole material comprises a liquid two-component polyurethane.

8. A method as set forth in claim 7 wherein the polyurethane is derived from one of a polyether and polyester polyols.

9. A method of making a shoe sole, the method comprising:

introducing a sheet portion of a thermoplastic material into a first mold;

introducing a quantity of an outsole material into the first mold;

using the first mold to form an outsole member comprised of the outsole material and the sheet portion with the sheet portion being secured to the outsole material;

introducing the outsole member into a second mold;

introducing a quantity of a midsole material into the second mold, the midsole material being in liquid form when introduced in the second mold, the liquid midsole material being curable to a resilient condition;

allowing the liquid midsole material to cure to the resilient condition to form a midsole portion secured to the sheet portion, the midsole portion and outsole member constituting the shoe sole.

10. A method as set forth in claim 9 further comprising the step of removing the shoe sole from the second mold.

11. A method as set forth in claim 10 wherein the step of allowing the liquid midsole material to cure precedes the step of removing the shoe sole from the second mold.

12. A method as set forth in claim 9 wherein the step of introducing the quantity of the outsole material into the first mold comprises introducing a solid elastomer material into the first mold.

13. A method as set forth in claim 12 wherein the step of using the first mold to form the outsole member comprises using the first mold to form the outsole member via a compression mold process.

14. A method as set forth in claim 9 wherein the second sole material comprises a liquid two-component polyurethane.

15. A method as set forth in claim 9 wherein the midsole portion comprises a blown polyurethane.

* * * * *